(12) United States Patent
Baek

(10) Patent No.: US 8,060,464 B2
(45) Date of Patent: Nov. 15, 2011

(54) DATA-CENTRIC DISTRIBUTED COMPUTING

(75) Inventor: Ock K. Baek, Unionville (CA)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 11/243,857

(22) Filed: Oct. 4, 2005

(65) Prior Publication Data
US 2006/0136425 A1 Jun. 22, 2006

(30) Foreign Application Priority Data
Dec. 16, 2004 (CA) ..................................... 2490645

(51) Int. Cl.
- G06F 7/00 (2006.01)
- G06F 12/00 (2006.01)
- G06F 9/44 (2006.01)
- G06F 9/445 (2006.01)

(52) U.S. Cl. ........ 707/609; 707/758; 707/821; 717/168; 717/174

(58) Field of Classification Search ............... 707/10; 710/1; 717/168, 174
See application file for complete search history.

(56) References Cited

U.S. PATENT DOCUMENTS

| | | | |
|---|---|---|---|
| 5,751,909 A | 5/1998 | Gower | |
| 6,256,771 B1 | 7/2001 | O'Neil et al. | |
| 6,330,710 B1 | 12/2001 | O'Neil et al. | |
| 6,345,386 B1 * | 2/2002 | Delo et al. | 717/176 |
| 6,353,446 B1 * | 3/2002 | Vaughn et al. | 715/733 |
| 6,389,589 B1 * | 5/2002 | Mishra et al. | 717/170 |
| 6,418,554 B1 * | 7/2002 | Delo et al. | 717/174 |
| 6,463,445 B1 | 10/2002 | Suzuki et al. | |
| 6,523,166 B1 * | 2/2003 | Mishra et al. | 717/174 |
| 6,538,667 B1 * | 3/2003 | Duursma et al. | 715/740 |
| 6,658,425 B1 | 12/2003 | Sluiman | |
| 6,836,794 B1 * | 12/2004 | Lucovsky et al. | 709/223 |
| 6,895,409 B2 | 5/2005 | Uluakar et al. | |
| 6,959,320 B2 | 10/2005 | Shah et al. | |
| 7,062,765 B1 | 6/2006 | Pitzel et al. | |
| 7,185,335 B2 | 2/2007 | Hind et al. | |
| 7,222,341 B2 | 5/2007 | Forbes et al. | |
| 2002/0052883 A1 | 5/2002 | Weissman-Berman | |
| 2002/0116374 A1 | 8/2002 | Bette et al. | |

(Continued)

OTHER PUBLICATIONS

Russinovich et al., Microsoft Windows Internals, Dec. 8, 2004, Microsoft Press, Fourth Edition.*

(Continued)

Primary Examiner — Vincent Boccio
Assistant Examiner — Huen Wong
(74) Attorney, Agent, or Firm — Schmeiser, Olsen & Watts; John Pivnichny (57) ABSTRACT

A distributed computing system provides a data management system in communication with a software management system and enables the software applications to move to the data to be processed in a distributed computing environment. The software management system stores a plurality of computer-executable software applications thereon and is in communication with a user system for receiving a selection of one of the plurality of software applications. The software management system generates an identifier for the selected software application which is provided to the data management system, which then obtains the selected software application from the software management system based on the identifier. The obtained software application is then executed with data from a data storage system using resources from a resource system. The resource system includes a plurality of resources and a manage mechanism for managing assignment of the plurality of resources to support execution of the software application.

16 Claims, 3 Drawing Sheets

U.S. PATENT DOCUMENTS

| | | | |
|---|---|---|---|
| 2002/0124270 A1* | 9/2002 | Mori et al. | 725/151 |
| 2002/0166001 A1* | 11/2002 | Cheng et al. | 710/1 |
| 2003/0084165 A1 | 5/2003 | Kjellberg et al. | |
| 2003/0131073 A1 | 7/2003 | Lucovsky et al. | |
| 2003/0158823 A1* | 8/2003 | Fulton et al. | 705/75 |
| 2003/0195980 A1 | 10/2003 | Geshwind | |
| 2003/0221190 A1 | 11/2003 | Deshpande et al. | |
| 2003/0237050 A1 | 12/2003 | Davidov et al. | |
| 2004/0002991 A1 | 1/2004 | Bogdan et al. | |
| 2004/0024875 A1 | 2/2004 | Horvitz et al. | |
| 2004/0176968 A1 | 9/2004 | Syed et al. | |
| 2004/0228607 A1* | 11/2004 | Tsutsumitake et al. | 386/46 |
| 2004/0261069 A1* | 12/2004 | Verbeke et al. | 717/166 |
| 2005/0120353 A1 | 6/2005 | Zhang et al. | |
| 2005/0125519 A1* | 6/2005 | Yang et al. | 709/223 |
| 2006/0074980 A1 | 4/2006 | Sarkar | |
| 2006/0206348 A1 | 9/2006 | Chen et al. | |
| 2006/0253397 A1 | 11/2006 | Gomez et al. | |
| 2007/0033659 A1 | 2/2007 | Hoche et al. | |

OTHER PUBLICATIONS

Balter et al., MCSE Windows XP Professional Exam Cram 2 (Exam 70-270), Nov. 2002, Exam Cram.*

Microsoft, "How to Deploy Office XP over a network", Sep. 13, 2004, Microsoft.*

Microsoft, "How to: Use Group Policy to Remotely Install Software in Windows 2000", Sep. 22, 2003, Microsoft.*

Microsoft, "Domain Controller Roles", Mar. 28, 2003, Microsoft.*

Fullerton et al., "Special Edition Using Microsoft Active Directory", Mar. 28, 2001, Que.*

Ding et al., Swoogle: A Semantic Web Search and Metadata Engine. Dept. of Computer Science and Electronic Engineering, Univ. of Maryland Baltimore County, Baltimore MD 21250, USA, CKIM 2004. http://ebiquity.umbc.edu/_file_directory_papers/116.pdf.

Duval et al., Metadata Principles and Practicalities. D-Lib Magazine, Apr. 2002. vol. 8, No. 4. ISSN 1082-9873, 10 pages.

Hauch et al., Information Intelligence: Metadata for Information Discovery, Access, and Integration. SIGMOD 2005 Jun. 14-16, 2005. Baltimore Maryland, USA. ACM 1-59593-060-4/05/06, pp. 793-798.

Movva et al., Syntactic and Semantic Metadata Integration for Science Data Use. Computers & Geosciences 31 (2005) 1126-1134.

Qin et al., The Semantic and Syntactic Model of Metadata. [online]. 9 pages. [retrieved on Jan. 21, 2008.] Retrieved from the Internet< URL: http//web.syr.edu/~jqin/papers/Metadata_model.pdf>.

Shasharina et al., FSML: Fusion Simulation Markup Language for Interoperability of D Analysis Tools. Proceedings. Challenges of Large Applications in Distributed Environments, Jul. 24, 2005, 7 pages ISBN-10: 0 7803 9043 1.

High Overhead. [online]. 2 pages [retrieved on Jun. 21, 2008]. Retrieved from the Internet< URL: http://code916.gsfc.nasa.gov/Data_services/doc/df/node10.html>.

IBM Technical Disclosure Bulletin IPCOM000134640D; e-Science platform for cross-institutional, interdisciplinary, collaborative research in emerging sciences and technologies; Original Publication Date: Mar. 13, 2006. 5 pages.

IBM Technical Disclosure Bulletin IPCOM000021806D; Method and system for obtaining a price quotation from multiple remote distributors in real time using internet and communication API. Original Publication Date: Feb. 9, 2004. 6 pages.

Tilman, Michel; "Designing for Change, a Dynamic Perspective," http://users.pandora.be/michel.tilman/Publications/GCSE2000KN.doc; Lecture Notes of Computer Science, vol. 2177, Springer-Verlag, 2001. 11 pages.

Berhane Zewdie and C. R. Carlson, "Adaptive Component Paradigm for Highly Configurable Business Components," 2006 IEEE International Conference Electro/Information Technology, Pub. Date May 7-10, 2006, pp. 185-190.

U.S. Appl. No.: 12/187,410, Filing Date Aug. 7, 2008; Confirmation No. 2958.

U.S. Appl. No.: 12/332,573, Filing Date Dec. 11, 2008; Confirmation No. 4734.

Aug. 27, 2009 Filed Preliminary Amendment for U.S. Appl. No. 12/332,573, Filing Date Dec. 11, 2008; Confirmation No. 4734.

* cited by examiner

DATA-CENTRIC DISTRIBUTED COMPUTING

CROSS-REFERENCE TO RELATED APPLICATIONS

This application claims priority from Canadian Patent Application Ser. No. 2490645 filed Dec. 16, 2004 and entitled Data-Centric Distributed Computing.

FIELD OF THE INVENTION

This invention relates generally to the field of distributed computing configurations and flows, and more particularly to a distributed computing environment that is data-centric rather than software-centric.

BACKGROUND OF THE INVENTION

Distributing computing environments, in which various components may be remotely located from each other, are designed around software applications that process data. In such an environment, the software applications in the system may be stored in a central location and data that is to be processed moves from a data store to the central location of the software applications. Since such a system is designed around the methods performed by the software applications, it is considered to be method-centric. A user of the distributed computing environment interacts more directly with the software applications than with the data. The data to be processed is remotely retrieved so that the data moves to where the software applications are located.

The distributed computing environment in which the data moves to the software applications operates well if the data that is moving is small. However, when the data is large, remote retrieval of the data can be a tedious process that can consume large amounts of resources for the transfer. When the data is retrieved, it is only a copy of the data that is sent. If multiple copies of the data are provided to multiple sources for processing and the data is altered during processing, then the integrity of the data becomes difficult to manage. Further, during the transfer of data to the location of the software applications the security of the data is reduced, thus introducing the possibility of corruption, theft, etc., and the possibility of non-compliance with statutory requirements for personal privacy protection.

SUMMARY OF THE INVENTION

Briefly stated, a distributed computing system provides a data management system in communication with a software management system and enables the software applications to move to the data to be processed in a distributed computing environment. The software management system stores a plurality of computer-executable software applications thereon and is in communication with a user system for receiving a selection of one of the plurality of software applications. The software management system generates an identifier for the selected software application which is provided to the data management system, which then obtains the selected software application from the software management system based on the identifier. The obtained software application is then executed with data from a data storage system using resources from a resource system. The resource system includes a plurality of resources and a manage mechanism for managing assignment of the plurality of resources to support execution of the software application.

According to an embodiment of the invention, a distributed computing system includes a software management system storing a plurality of computer-executable software applications, the software management system being in communication with a user system for receiving a selection of one of the plurality of software applications therefrom, wherein the software management system generates an identifier for the selected software application for transmission thereby; and a data management system in communication with the software management system, wherein the data management system includes a data storage system for storing and managing data to be processed; an application acquire mechanism for obtaining the software application from the software management system based on the identifier for the software application received by the application acquire mechanism; a resource manager, interfacing with a resource system containing a plurality of resources, for managing assignment of the plurality of resources to support execution of the software application; and a software processing mechanism for executing the obtained software application with the data using assigned resources from the resource system.

According to an embodiment of the invention, a method of data management includes the steps of (a) receiving a selection for data that is to be processed, the data being stored in a data storage system; (b) receiving an identifier for a software application in a software management system storing a plurality of software applications; (c) obtaining the software application from the software management system based on the identifier; (d) determining assignment of resources from a resource system to be used to support execution of the obtained software application; and (e) executing the obtained software application with the selected data using the assigned resources.

According to an embodiment of the invention, a method of distributed computing includes the steps of (a) receiving a selection of one of a plurality of software applications at a software management system from a user system; (b) providing an identifier for the selected software application from the software management system to a data management system; (c) receiving a selection of data from a data storage system at the data management system from the user system; (d) receiving the identifier for the software application at the data management system; (e) obtaining the selected software application in the software management system at the data management system based on the identifier; (f) determining, at the data management system, assignment of resources from a resource system to be used to support execution of the obtained software application; and (g) executing the obtained software application with the selected data using the assigned resources.

According to an embodiment of the invention, a computer program product includes a computer useable medium including a computer readable program, wherein the computer readable program when executed on at least one computer causes the at least one computer to (a) receive a selection of one of a plurality of software applications at a software management system from a user system; (b) provide an identifier for the selected software application from the software management system to a data management system; (c) receive a selection of data in a data storage system at the data management system from the user system; (d) receive the identifier for the software application at the data management system; (e) obtain the selected software application from the software management system at the data management system based on the identifier; (f) determine resources at the data management system to be used for executing the obtained software application; and (g) execute the obtained software application with the data using the assigned resources.

DETAILED DESCRIPTION OF THE PREFERRED EMBODIMENT

Figure 1:
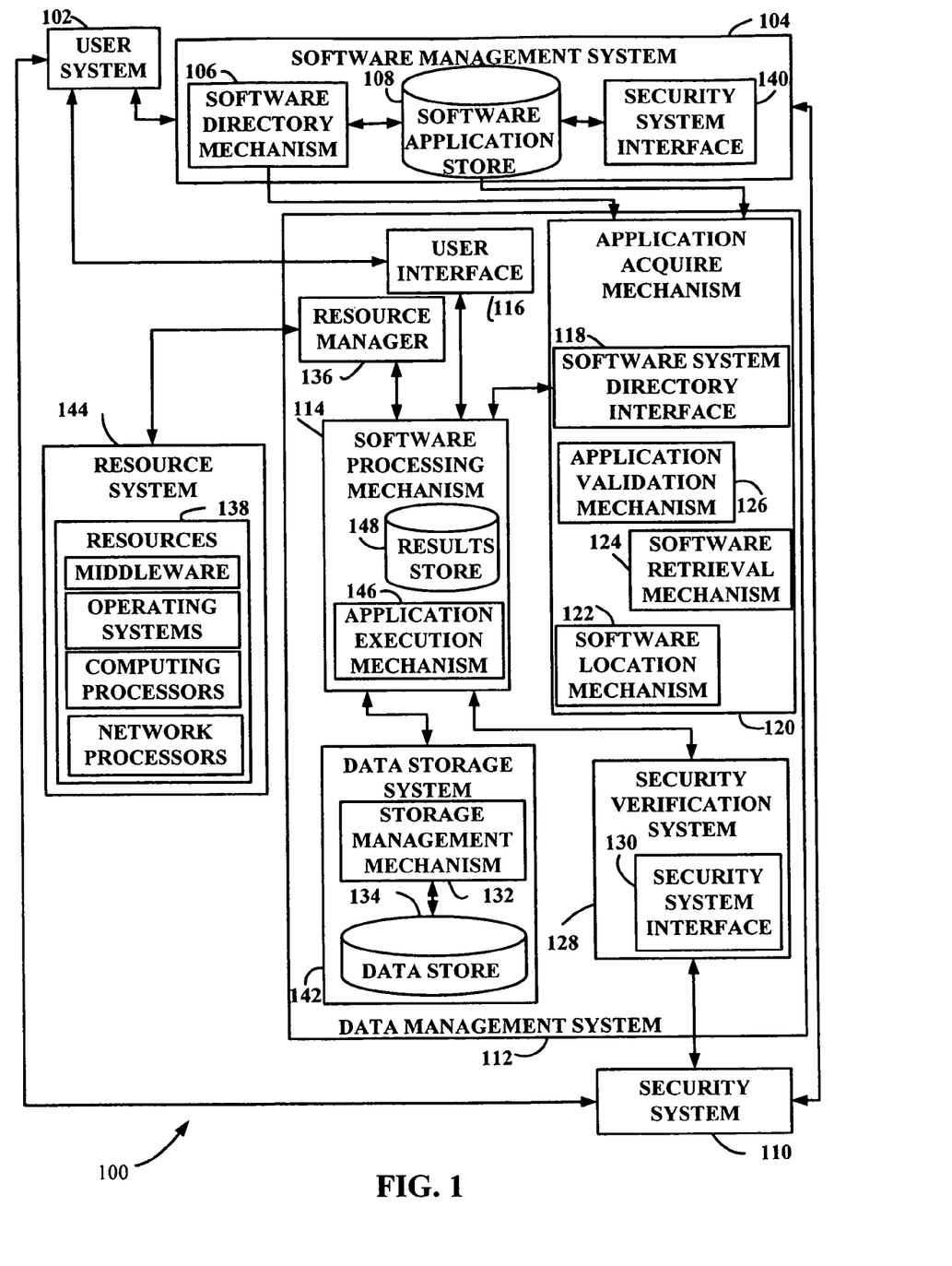
FIG. 1 illustrates a data-centric computing system according to the present invention.

FIG. 1 illustrates a data-centric computing system 100 of the present invention. In the data-centric computing system 100 computer-executable software applications are located in a software management system 104 that is remote from data residing in a data management system 112. The software applications are transferred to the data management system 112 for interaction with the data. The software application accesses the data and stores a processed result in the data management system 112. The software application is then unloaded from the data management system 112 when execution is complete.

A user system 102, the software management system 104, a resource system 144 and a security system 110 interact with the data management system 112. Each of these systems may be remotely located from each other and may communicate via a network (not shown). Alternatively, one or more of the systems may reside together and may access the other systems remotely.

The security system 110 provides a third party central security service for the user system 102, the software management system 104 and the data management system 112. Each of these systems registers with the security system 110. As software applications and data are requested and processed, the systems involved may communicate with the security system 110 to determine if another system participating in the action has access privileges for the software applications or data of the action. The security system 110 may be based on, for example, public key infrastructure (PKI). The security system 110 may enable the software management system 104 to digitally sign and encrypt the software applications before they become available for use, and also enable the data management system 112 to decrypt the software applications and verify authenticity and integrity of the software application using the software management system's digital signature. The security system 110 may also provide credentials, register public keys and acquire and authenticate certificates for and from the systems. While the data-centric computing system 100 is shown with the security system 110 in FIG. 1, such a security measure may not be necessary if the software management system 104, the data management system 112 and the user system 102 are in communication via a secure network.

The user system 102 receives input from a user and enables communication with the software management system 104, the security system 110 and the data management system 112. The user registers with the security system 110 via the user system 102 and obtains a security certificate. This certificate is used in communications with the software management system 104 and the data management system 112 to verify the identity of the user and validate data and software application access privileges. Results of data processed by the data management system 112 using a software application from the software management system 104 are provided to the user system 102. The results of data processed by the data management system 112 may be digitally signed and encrypted for secure transmission with confidentially and integrity from the data management system 112 to the user system 102.

The software management system 104 manages and stores software applications that are used to process data. A software directory mechanism 106, a software application store 108 and a security system interface 140 are included in the software management system 104. The software directory mechanism 106 and the software application store 108 may be remotely located from each other or they may reside in the same location. The software application store 108 stores software applications that can process data stored in the data management system 112. These stored software applications may be encrypted within the software application store 108 or encryption may be performed just prior to the software application being transferred to the data management system 112. The security system interface 140 enables the software management system 104 to communicate with the security system 110 so that users can register therewith and security information indicating the authenticity and integrity of the software application can be verified.

The software directory mechanism 106 acts as an interface to the software application store 108 by containing an index of all stored software applications. All of the software applications in the software application store 108 are registered with the software directory mechanism 106. The software directory mechanism 106 may contain the name, an identification number, location and a categorization of each software application. Each software application may be provided with a classification according to, for example, industry, service category, function, input attributes, etc., to assist in searching and selecting a software application. The user system 102 communicates with the software directory mechanism 106 for browsing and selecting a software application from the software application store 108 that will be used for processing data.

A user of the software management system 104 registers with the security system 110 before supplying software applications. The user of the software management system 104 obtains a certificate from the security system 110 for registration of a new software application. The software application provided to the software management system 104 may be digitally signed and encrypted by the user of the software management system 104. The software management system 104 validates the user's security certificate via the security system interface 140 and registers the new software application(s) with the software directory mechanism 106. The behavior of the new software application(s) may also be verified to determine that the new software application(s) will not negatively impact the data management system 112 when executed. The new software application(s) may be categorized according to the software application classifications in the software directory mechanism 106.

When the user system 102 accesses the software directory mechanism 106, it is the user's security certificate that enables access thereto. The software directory mechanism 106 may validate the user's certificate via the security system interface 140 before the user is allowed to browse through the software applications listed therein. After the user has selected a software application, the software directory mechanism 106 validates the access privileges of the user system 102 for the selected software application by providing the user's security certificate to the security system 110 via the security system interface 110. When the validation has been successfully completed, the software directory mechanism 106 provides information, e.g., software application identification, location, name, and security information for the user who provided the software application and/or the software management system 104, about the selected software application to the data management system 112.

The resource system 144 provides resources 138 for execution of software applications. The resources 138 may include middleware, operating systems, computing processors, network processors, etc.

The data management system 112 contains a data storage system 142 that retains the data that is to be processed. Software applications from the software management system 104 are obtained by the data management system 112 and used to process the data. The data management system 112 has various interfaces for the other systems including a user interface 116 for the user system 102, an application acquire mechanism 120 for the software management system 104, a resource manager 136 for the resource system 144 and a security verification system 128 for the security system 110. In the data management system 112, a software processing mechanism 114 coordinates receiving user input, obtaining software applications, verifying security information on the software management system 104 and the user system 102, allocating resources in the resource system 144 for the software application via the resource manager 136, executing obtained software applications using data in the data storage system 142, and returning a result from the processed software application against the data to the user system 102 via the user interface 116.

The user interface 116 enables communication with the user system 102. The user system 102 can search through data in the data storage system 142 via the user interface 116 to locate the data that is to be processed. Security information for the user system 102 is provided to the data management system 112 via the user interface 116. After the data has been processed using a software application(s) from the software management system 104, the results of such processing are sent to the user system 102 via the user interface 116.

The application acquire mechanism 120 includes a software system directory interface 118, which is in communication with the software directory mechanism 106 of the software management system 104. After the user system 102 has selected a software application via the software directory mechanism 106, a message providing the location, name and an identification number of the software application and security information is sent to the software system directory interface 118.

The application acquire mechanism 120 also includes a software location mechanism 122, a software retrieval mechanism 124, and an application validation mechanism 126 all of which function together to obtain the software application location information from the software system directory interface 118 and acquire the indicated software application. The software location mechanism 122 extracts the location, identification number and name of the software application from the message received from the software directory mechanism 106. The software location mechanism 122 also extracts the security information and may verify this information with the security system 110 prior to the software management system 104 being contacted to obtain the software application. Based on the extracted software application location and software application name, the corresponding software application store 108 is contacted by the software retrieval mechanism 124 with a request to transmit the indicated software application from the software application store 108 to the data management system 112. This request includes an indication of the software application as well as the data management system's security certificate. After the software application has been retrieved, various checking procedures may be optionally performed on the software application by the application validation mechanism 126. The application validation mechanism 126 decrypts the software application and validates the credentials of the user of the software management system 104 who provided the software application as well as the authenticity and integrity of the software application. The software application is then verified to determine if the software application will corrupt or otherwise harm data in the data management system 112 when executed and to test for other security issues.

The security verification system 128 checks the security information from the software management system 104 and from the user system 102 with the security system 110 to verify identities of all parties (i.e. authenticate all parties and validate that all parties are authorized to access the data against which the software application will be executed.) The security verification system 128 includes a security system interface 130 that manages communications with the security system 110.

The software processing mechanism 114 acts as a central command during acquisition of the software application and selection of the data. After the data has been selected and the software application has been acquired, the software application is provided to a application execution mechanism 146 in the software processing mechanism 114 where the software application is executed using the selected data. The result of the executed software application is stored in a results store 148 in the software processing mechanism 114 before being provided to the user system 102 via the user interface 116.

The software processing mechanism 114 holds the software application until the data has been processed by the software application. After the data has been processed, the software processing mechanism 114 removes the software application from the data management system 112.

The data storage system 142 includes a storage management mechanism 132 which links the software processing mechanism 114 with a data store 134 in the data storage system 142 storing the data. Requests to extract data from the data store 134 for processing and requests to revise the data are conveyed to the storage management mechanism 132. The storage management mechanism 132 can act as a central interface to the data store 134 thereby providing integrity for the data in the data store 134.

The resource manager 136 manages the allocation of the resources in the resource system 144. When the software processing mechanism 114 wants resources in a particular quantity and configuration for execution of a software application, a request is sent to the resource manager 136. The resource manager 136 assigns resources to various execution tasks and balances requests for such resources to ensure that a particular resource is never over-allocated. The resource manager 136 communicates with the resource system 144 to provide the desired configuration of resources for execution of the software application.

With the resources allocated, the software processing mechanism 114 and the application execution mechanism 146 executes the software application using the selected data on the allocated resources. Results of this processing are stored in the results store 148.

The software processing mechanism 114 can encrypt and digitally sign the execution results in collaboration with the security system 110 via the security system interface 130 in the security verification system 128, before sending the result to the user system 102 via the user interface 116.

The results stored in the results store 148 may be discarded or may be persisted in the data store 134 at the data storage system 142, depending on the nature of the software applications, after they have been sent to the user system 102.

Figure 2:
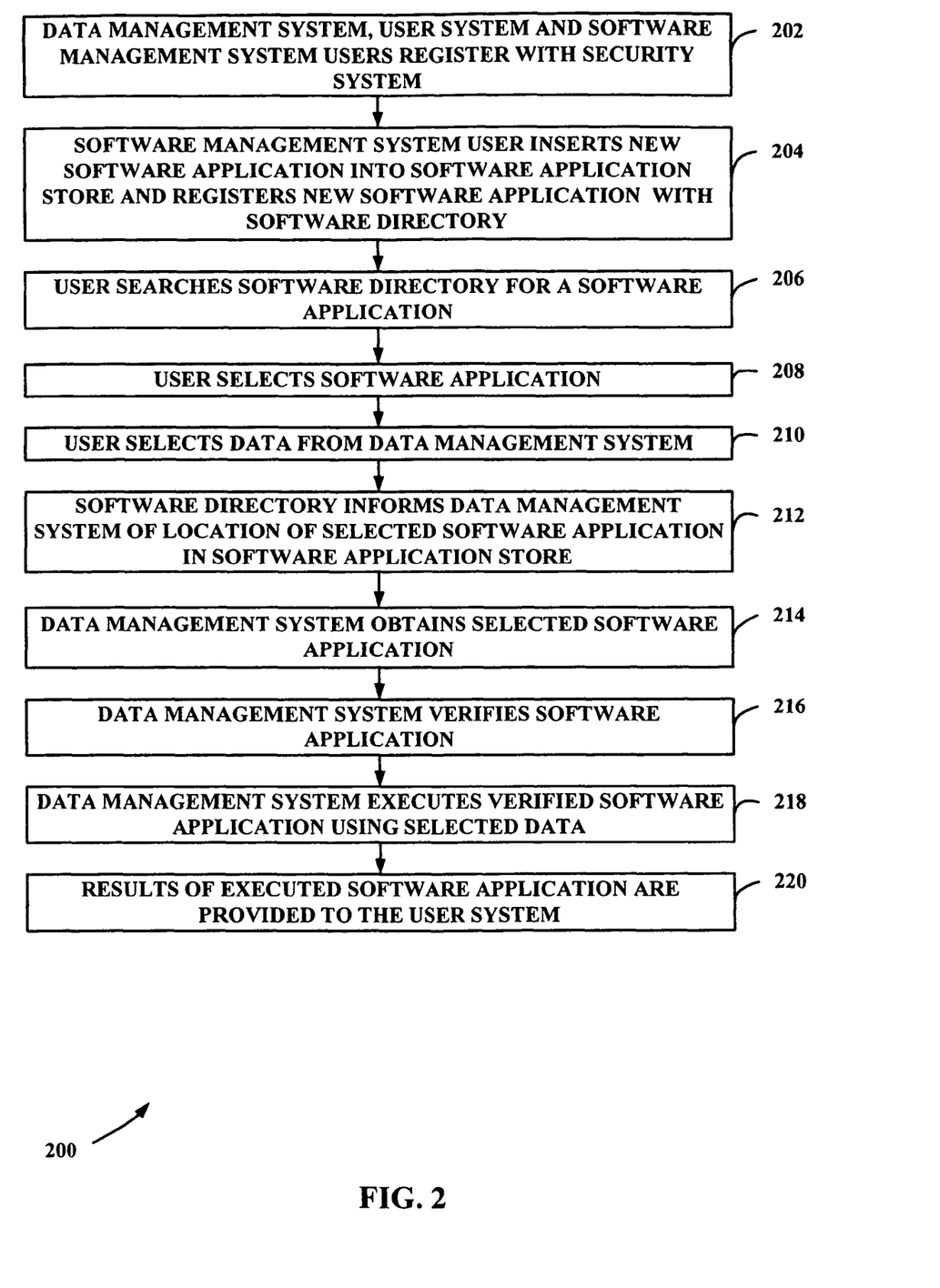
FIG. 2 illustrates a data and command flow in the data-centric computing system of FIG. 1.

FIG. 2 shows a method 200 illustrating a data and command flow in the entire data-centric computing system 100 of FIG. 1. The data management system 112, a user of the user system 102 and users of the software management system 104 register with the security system 110 in step 202. The software management system user inserts a new software application into the software application store 108 in step 204. The software management system user may keep the software application on his computer system (not shown) as an alternative to storing the software application in the software application store 108. In such a case the software directory mechanism 106 will contain the identifier for the software application and an indication of the location of the software management system user's computer system. That new software application is also registered with the software directory mechanism 106 so that the user system 102 will be provided with an indication of the new software application when searching the software applications in the software management system 104.

The user of the user system 102 searches the software directory mechanism 106 for a software application in step 206. The user selects a software application in step 208. The user also selects data from the data management system 112 in step 210.

The software directory mechanism 106 informs the data management system 112 of the location of the selected software application in the software application store 108 in step 212. The data management system 112 obtains the selected software application in step 214 and verifies that the software application will not negatively impact the data management system 112 if executed in step 216.

The verified software application is executed by the data management system using the selected data in step 218. Results of the executed software application are provided to the user system 102 in step 220.

Figure 3:
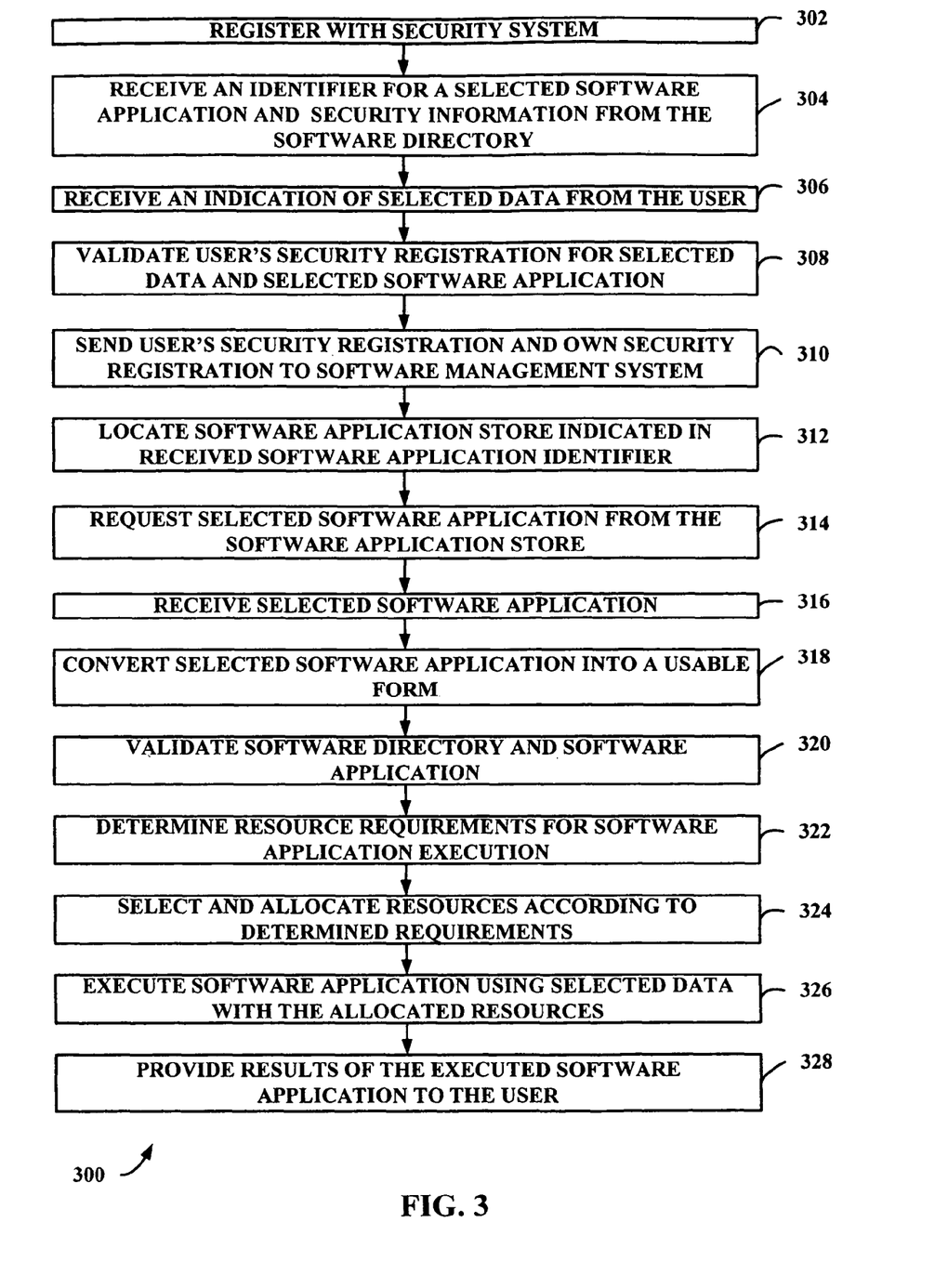
FIG. 3 illustrates a data and command flow of a data management system in the data-centric computing system of FIG. 1.

FIG. 3 shows a method 300 illustrating a data and command flow for the data management system 112 of FIG. 1. The data management system 112 first registers with the security system 110 in step 302. An identifier for a selected software application and security information are received in step 304 from the software directory mechanism 106. The user system 102 provides security information and an indication of selected data that is to be used for executing the selected software application in step 306.

The user's security information received from the user system 102 is sent to the security system 110 for validation that a current user of the user system 102 has access privileges to both the selected data and the selected software application in step 310. Based on the selected software application identifier received in step 304, the software application store 108 indicated is located in step 312. The selected software application is requested in step 314 and received in step 316.

The software application received in step 316 is converted into a usable form in step 318. Such conversion may involve decrypting the software application. Security information on the software directory mechanism 106 is validated with the security system 110 in step 320. The software application is also validated to check that it will not negatively impact the data management system 112 or the data when executed. Resources that are to be used for execution of the validated software application are determined in step 322. These resources are then selected, allocated and configured in step 324. The software application is executed using the selected data with the allocated resources in step 326 and the results are provided to the user system in step 328.

The detailed description of embodiments of the invention does not limit the implementation of the embodiments to any particular computer programming language. A computer program product embodiment of the invention may be implemented in any computer programming language provided that the operating system provides the facilities that support the requirements of the computer program product. Any limitations presented would be a result of a particular type of operating system, computer programming language, or data processing system and would not be a limitation of the embodiments described herein.

Embodiments of the present invention may be implemented in any conventional computer programming language. For example, embodiments may be implemented in a procedural programming language (e.g. "C") or an object oriented language (e.g. "C++", "Java"), or a fourth generation language (e.g. "Perl", "python"). Further embodiments of the invention may be implemented as pre-programmed hardware elements, other related components, or as a combination of hardware and software components.

Embodiments of the invention can be implemented as a computer program product for use with a computer system. Such implementation may include a series of computer instructions fixed either on a tangible medium, such as a computer readable medium (e.g. a disk storage, magnetic tape, diskette, CD-ROM, ROM, or fixed disk) or transmittable to a computer system, via a modem or other interface device, such as a communications adapter connected to a network over a medium. The medium may be either a tangible medium (e.g. optical or electrical communications lines) or a medium implemented with wireless techniques (e.g. microwave, radio frequency, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, radio frequency, microwave, or other transmission technologies. It is expected that such a computer program product may be distributed as a removable medium with accompanying printed or electronic documentation (e.g. shrink wrapped software), preloaded with a computer system (e.g., on system ROM or fixed disk), or distributed from a server over the network (e.g., the Internet, extranet, intranet, or World Wide Web). Some embodiments of the invention may be implemented as a combination of both software (e.g. a computer program product) and hardware. Still other embodiments of the invention may be implemented as entirely hardware, or entirely software (e.g. a computer program product)."

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method of data-centric distributed computing, said method comprising:

a software management system receiving from a user system a selection of a software application that had been selected by the user system from a plurality of software applications stored at the software management system;

after said receiving the selection of the software application, said software management system sending an identifier of the selected software application to a data management system;

after said receiving the selection of the software application and before said sending the identifier, receiving from the user system a selection of data that is stored in the data management system, said software application being remote from said data stored in the data management system during said receiving the selection of data;

after said receiving the identifier, said data management system requesting the selected software application from the software management system based on the identifier;

after said requesting, a software processing mechanism of said data management system receiving the selected software application from the software management system based on the identifier;

said data management system assigning resources from a resource system to be used to support execution of the received software application, said resources comprising at least one resource selected from the group consisting of middleware, operating systems, computing processors, network processors, and combinations thereof;

after said assigning resources, a computer at said data management system executing the received software application via the software processing mechanism using the selected data and using the assigned resources;

said data management system storing a result from said executing in a results store in the software processing mechanism; and after said storing the result, said data management system transmitting the result to the user system, wherein the software management system, the data management system, the resource system, and the user system are remotely located from one another and in communication with one another via a network comprising the Internet.

2. The method of claim 1, said method further comprising:

after said transmitting the result, removing the result from the result store; and after said removing the result from the result store, discarding the result.

3. The method of claim 1, said method further comprising:

after said transmitting the result, removing the result from the result store; and after said removing the result from the result store, persisting the result by storing the result in a persistent data store of the data management system.

4. The method of claim 1, said method further comprising:

prior to said transmitting the result, digitally signing and encrypting the result for secure transmission of the result with confidentially and integrity from the data management system to the user system.

5. The method of claim 1, said method further comprising:

after said executing, removing the software application from the data management system.

6. The method of claim 1, wherein each software application of the plurality of software applications stored at the software management system has a classification according to an industry, service category, function, and input attributes, and wherein the method further comprises:

prior to said receiving the selection of the software application, said software management system providing said attributes of each software application to the user system to assist the user system to search and select the software application.

7. A computer program product, comprising a computer readable storage device having a computer readable program code stored therein, said computer readable program code configured to be executed on at least one computer to implement a method of data-centric distributed computing, said method comprising:

a software management system receiving from a user system a selection of a software application that had been selected by the user system from a plurality of software applications stored at the software management system;

after said receiving the selection of the software application, said software management system sending an identifier of the selected software application to a data management system;

after said receiving the selection of the software application and before said sending the identifier, receiving from the user system a selection of data that is stored in the data management system, said software application being remote from said data stored in the data management system during said receiving the selection of data;

after said receiving the identifier, said data management system requesting the selected software application from the software management system based on the identifier;

after said requesting, a software processing mechanism of said data management system receiving the selected software application from the software management system based on the identifier;

said data management system assigning resources from a resource system to be used to support execution of the received software application, said resources comprising at least one resource selected from the group consisting of middleware, operating systems, computing processors, network processors, and combinations thereof;

after said assigning resources, said data management system executing the received software application via the software processing mechanism using the selected data and using the assigned resources;

said data management system storing a result from said executing in a results store in the software processing mechanism; and after said storing the result, said data management system transmitting the result to the user system, wherein the software management system, the data management system, the resource system, and the user system are remotely located from one another and in communication with one another via a network comprising the Internet.

8. The computer program product of claim 7, said method further comprising:

after said transmitting the result, removing the result from the result store; and after said removing the result from the result store, discarding the result.

9. The computer program product of claim 7, said method further comprising:

after said transmitting the result, removing the result from the result store; and after said removing the result from the result store, persisting the result by storing the result in a persistent data store of the data management system.

10. The computer program product of claim 7, said method further comprising:

prior to said transmitting the result, digitally signing and encrypting the result for secure transmission of the result with confidentially and integrity from the data management system to the user system.

11. The computer program product of claim 7, said method further comprising:

after said executing, removing the software application from the data management system.

12. A system, comprising at least one computer, each computer comprising a computer readable memory unit, said memory unit containing program code configured to be executed on the at least one computer to implement a method of data-centric distributed computing, said method comprising:

a software management system receiving from a user system a selection of a software application that had been selected by the user system from a plurality of software applications stored at the software management system;

after said receiving the selection of the software application, said software management system sending an identifier of the selected software application to a data management system;

after said receiving the selection of the software application and before said sending the identifier, receiving from the user system a selection of data that is stored in the data management system, said software application being remote from said data stored in the data management system during said receiving the selection of data;

after said receiving the identifier, said data management system requesting the selected software application from the software management system based on the identifier;

after said requesting, a software processing mechanism of said data management system receiving the selected software application from the software management system based on the identifier;

said data management system assigning resources from a resource system to be used to support execution of the received software application, said resources comprising at least one resource selected from the group consisting of middleware, operating systems, computing processors, network processors, and combinations thereof;

after said assigning resources, said data management system executing the received software application via the software processing mechanism using the selected data and using the assigned resources;

said data management system storing a result from said executing in a results store in the software processing mechanism; and after said storing the result, said data management system transmitting the result to the user system, wherein the software management system, the data management system, the resource system, and the user system are remotely located from one another and in communication with one another via a network comprising the Internet.

13. The system of claim 12, said method further comprising:

after said transmitting the result, removing the result from the result store; and after said removing the result from the result store, discarding the result.

14. The system of claim 12, said method further comprising:

after said transmitting the result, removing the result from the result store; and after said removing the result from the result store, persisting the result by storing the result in a persistent data store of the data management system.

15. The system of claim 12, said method further comprising:

prior to said transmitting the result, digitally signing and encrypting the result for secure transmission of the result with confidentially and integrity from the data management system to the user system.

16. The system of claim 12, said method further comprising:

after said executing, removing the software application from the data management system.

* * * * *